(12) United States Patent
Ghebremeskel et al.

(10) Patent No.: US 11,236,260 B2
(45) Date of Patent: Feb. 1, 2022

(54) DIVERTING AGENTS BASED ON THERMOPLASTIC POLYVINYL ALCOHOL PELLETS

(71) Applicant: KURARAY CO., LTD., Kurashiki (JP)

(72) Inventors: Ghebrehiwet Ghebremeskel, Houston, TX (US); Keisuke Morikawa, Houston, TX (US); Richard Cazares, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 223 days.

(21) Appl. No.: 16/554,177

(22) Filed: Aug. 28, 2019

(65) Prior Publication Data

US 2020/0071592 A1  Mar. 5, 2020

Related U.S. Application Data

(60) Provisional application No. 62/723,619, filed on Aug. 28, 2018, provisional application No. 62/776,220, filed on Dec. 6, 2018.

(51) Int. Cl.

| | |
|---|---|
| *E21B 33/138* | (2006.01) |
| *C09K 8/42* | (2006.01) |
| *C09K 8/516* | (2006.01) |
| *C09K 8/487* | (2006.01) |
| *C08L 31/04* | (2006.01) |
| *C08L 3/02* | (2006.01) |
| *C08K 3/013* | (2018.01) |
| *C08K 3/16* | (2006.01) |
| *C08K 3/26* | (2006.01) |
| *C08K 3/22* | (2006.01) |
| *C08L 29/04* | (2006.01) |
| *C09K 8/44* | (2006.01) |
| *C08F 16/06* | (2006.01) |
| *C08J 3/12* | (2006.01) |

(52) U.S. Cl.
CPC .............. *C09K 8/516* (2013.01); *C08F 16/06* (2013.01); *C08J 3/12* (2013.01); *C08K 3/013* (2018.01); *C08K 3/16* (2013.01); *C08K 3/22* (2013.01); *C08K 3/26* (2013.01); *C08L 3/02* (2013.01); *C08L 29/04* (2013.01); *C08L 31/04* (2013.01); *C09K 8/426* (2013.01); *C09K 8/44* (2013.01); *C09K 8/487* (2013.01); *E21B 33/138* (2013.01); *C08F 2810/00* (2013.01); *C08K 2003/162* (2013.01); *C08K 2003/2296* (2013.01); *C08K 2003/265* (2013.01); *C08K 2201/005* (2013.01); *C08L 2201/06* (2013.01); *C08L 2205/06* (2013.01)

(58) Field of Classification Search
CPC .................................. C09K 8/426; C09K 8/44
USPC ........................................................... 166/295
See application file for complete search history.

(56) References Cited

U.S. PATENT DOCUMENTS

| | | | | |
|---|---|---|---|---|
| 4,119,604 | A * | 10/1978 | Wysong ............... | C11D 17/041 524/377 |
| 5,362,778 | A * | 11/1994 | Famili ....................... | C08L 3/00 264/185 |
| 8,955,430 | B2 * | 2/2015 | LeBlanc ................ | B01F 3/1221 100/35 |
| 2015/0233226 | A1 * | 8/2015 | Holzhauser ........... | E21B 43/267 166/280.1 |
| 2016/0122618 | A1 | 5/2016 | Nguyen et al. | |
| 2017/0166798 | A1 | 6/2017 | Okamoto et al. | |
| 2017/0260309 | A1 * | 9/2017 | Collins .................. | D21H 19/60 |
| 2019/0023825 | A1 | 1/2019 | Collins et al. | |

FOREIGN PATENT DOCUMENTS

| | | |
|---|---|---|
| CN | 107266838 A | 10/2017 |
| CN | 107936431 A | 4/2018 |
| WO | WO 2015/026355 A1 | 2/2015 |
| WO | WO 2019/031613 A1 | 2/2019 |

OTHER PUBLICATIONS

International Search Report and Written Opinion dated Nov. 12, 2019 in PCT/US2019/048641, 16 pages.
International Search Report and Written Opinion dated Oct. 29, 2019 in PCT/US2019/048610, 16 pages.
International Search Report and Written Opinion dated Oct. 31, 2019 in PCT/US2019/048595, 21 pages.
International Search Report and Written Opinion dated Oct. 25, 2019 in PCT/US2019/048626, 16 pages.
Chikhacheva, I.P., et al., "Polymer-Analog Reactions of Polyvinyl Alcohol under the Action of Microwave Radiation", Russian Journal of General Chemistry, vol. 81 No. 3, 2011, p. 545-549.

* cited by examiner

*Primary Examiner* — Crystal J Miller
*Assistant Examiner* — Ashish K Varma
(74) *Attorney, Agent, or Firm* — Oblon, McClelland, Maier & Neustadt, L.L.P.

(57) ABSTRACT

A biodegradable and substantially water-soluble thermoplastic polyvinyl alcohol-based diverting agent is provided which comprises pellets of a specified polyvinyl alcohol optionally with certain specified additives, which pellets are made in an extruder and cut to a specified size.

19 Claims, No Drawings

DIVERTING AGENTS BASED ON THERMOPLASTIC POLYVINYL ALCOHOL PELLETS

CROSS-REFERENCE TO RELATED APPLICATIONS

This application claims priority under 35 U.S.C. § 119 from U.S. Provisional Application Ser. Nos. 62/723,619, filed 28 Aug. 2018, and 62/776,220, filed 6 Dec. 2018, the disclosures of which are incorporated by reference herein for all purposes as if fully set forth.

FIELD OF THE INVENTION

The present invention relates to diverting agents based on substantially water-soluble thermoplastic polyvinyl alcohol compositions. In particular, the present invention relates to particulate, water-soluble diverting agents manufactured by pelletizing a specified thermoplastic polyvinyl alcohol composition optionally with certain specified additives. The diverting agents of the present invention are biodegradable and substantially water-soluble to provide temporary blockage during a subsurface treatment. Because the polyvinyl alcohol in the diverting agent is substantially water soluble, the diverting agent dissolves over time in the wellbore and is ultimately removed after the subsurface treatment is completed.

BACKGROUND OF THE INVENTION

During oil production from subterranean formations by natural forces, only a small fraction of the total oil present in the reservoir is recovered. A variety of techniques have been developed to recover oil beyond that which is produced by the natural forces. One common procedure is to introduce a fluid into the oil-bearing formation in order to displace the oil to a production system comprising one or more production wells. The displacing fluid may, for example, be brine, fresh water, steam, or gas. The most cost-effective recovery methods typically utilize steam.

One technique for increasing production is to increase the porosity of the oil-bearing formation by injection of a high-pressure drive fluid to fracture the formation, thereby allowing further access of the displacing fluid into the oil-bearing formation.

Such injection fluids preferentially enter higher permeability areas (typically containing less oil), thus not reaching their intended targets (lower permeability areas). It is therefore desirable to plug the regions of higher permeability with a "diverting agent" to divert the drive fluid into regions of lower permeability. It is also desirable that the diverting agent possess a property of controlled solubility wherein a satisfactory solid plug is formed for a period of time after which the plug is removed without further effort or treatment, for example, by being slowly dissolved.

Physical plugging of the high permeability regions by cements and solid slurries has been tried with varying degrees of success. These techniques, however, have the drawback that they may remain intact for extended periods (or even permanently), and still-productive sites may consequently be permanently closed or require extraordinary efforts to reopen.

Several techniques of addressing the issue with the areas of differing permeability within a wellbore have been disclosed in the patent literature.

For example, U.S. Pat. No. 2,803,306 discloses a process for increasing the permeability of an underground formation having several zones of varying permeability. The treatment fluid that was utilized contains HCl with oil-soluble particles dispersed in it. The dispersed particles provide a partial blockage of the permeable zones of the subterranean formation, thereby allowing the treatment fluid to enter the less-permeable zones.

U.S. Pat. No. 3,724,549 describes a material for diverting aqueous treatment fluids into the less permeable subterranean formations. The described material is composed of a carrier liquid and graded particles of cyclic or linear hydrocarbon resins having between 20 and 1400 carbon atoms, and a melting point of about 200° F. The particles sizes were in the range of 3 mesh to 200 mesh sieve. The particles are described as being water and acid insoluble, but soluble in oil. This means that the particles were designed to be removed by the produced oil after the completion of the treatment operation.

U.S. Pat. No. 3,797,575 discloses diverting-forming additives comprised of relatively water-insoluble solid material dissolved in a solvent such as methanol or isopropanol. When the additive is combined with an aqueous treatment fluid, the solid material, dissolved in the additive, is precipitated in the aqueous treating fluid into a finely divided form, which then acts as a diverting agent.

U.S. Pat. No. 3,872,923 discloses the use of certain radiation-induced polymers as either temporary or permanent diverting agents. Temporary or permanent reductions in permeability were obtained by injecting an aqueous solution containing a water-soluble polymer obtained by radiation-induced polymerization of acrylamide and/or methacrylamide and acrylic acid, methacrylic acid, and/or alkali metal salts of such acids. The resultant polymeric diverting agent has properties, such as temperature and pH stability, so as to effect a reduction of permeability of the porous medium. Permeability within the formation can be restored by subsequent treatment with a chemical to break down the polymer, such as hydrazine hypochlorite solution or strong mineral acids.

U.S. Pat. Nos. 3,954,629 and 4,005,753 disclose polymeric diverting agents, and methods of treating subterranean formations with such polymeric diverting agents. The disclosed polymeric compositions comprise solid particles of a homogenous mixture of polyethylene, ethylene-vinyl acetate copolymer, a polyamide, and a softening agent such as a long chain aliphatic diamide. The disclosed polymeric diverting agents are said to be suitable for use in subterranean formations where formation temperatures are 350° F. or higher, and are also said to have controlled oil-solubility for ultimate removal.

U.S. Pat. No. 4,527,628 describes methods of temporarily plugging a subterranean formation using a diverting material comprising an aqueous carrier liquid and a diverting agent comprising a solid azo component and a methylenic component having a melting point of at least 332.6° F., a degree of solubility in water at a temperature of about 200° F. to about 425° F., and a degree of solubility in kerosene at a temperature of about 200° F. to about 425° F.

U.S. Pat. No. 4,665,986 discloses a polyvinyl alcohol based gel-forming composition to reduce channeling in subsurface formations. The composition comprises a specified polyvinyl alcohol or copolymer and a crosslinking agent, which reacts to form a gel for stably plugging unproductive steam channels.

U.S. Pat. No. 6,367,548B1 describes methods and compositions for stimulating multiple intervals in subterranean wells by diverting well treatment fluids into multiple intervals. According to the invention, this was accomplished by alternately displacing diverting agent from the annulus of the wellbore into a subterranean formation and displacing treatment fluid from a tubing string into the subterranean formation.

US2011/0005761A1 describes a degradable diverting agent comprised of a material selected from a fatty alcohol, fatty ester, proteinous material and a fatty acid salt, which may be used in combination with other types of degradable diverting agents.

WO2006/088603A1 discloses the use of diverting agents coated with certain specified water-soluble materials including a collagen, poly(alkylene oxide), poly(lactic acid), polyvinyl alcohol and a polyvinyl acetate/polyvinyl alcohol polymer. Following completion of the treatment, the publication indicates that the diverting agent can be removed from the formation by dissolving the water-soluble coating.

WO2018/231236A1 and WO2019/031613A1 also discloses the use of polyvinyl alcohols as diverting agents.

In accordance with the present invention, it has been found that certain specified polyvinyl alcohol resins, pelletized as set forth in detail below in combination with one or more specified additives, are highly effective as diverting agents for use in subterranean treatments.

Melt-extrudable thermoplastic polyvinyl alcohol compositions comprise a polyvinyl alcohol/plasticizer blend that is preferably prepared via mixing of the constituents in a forced circulation high-speed mixer, using a suitable temperature profile. These processes are described, for example, in U.S. Pat. Nos. 4,323,492, 4,542,178 and 4,656,216.

The melting of polyvinyl alcohol occurs by first melting the small and less than perfect crystals which melt at a temperature of approximately 100-120° C. lower than that of the perfect crystals. Thus a melt is generated by consecutive melting of crystals having a higher and higher melting point until only the perfect and highest-melting crystals remain.

Several attempts for thermal processing of polyvinyl alcohol have involved direct extrusion of the polymer into films or other articles in order to avoid prolonging the time at the increased temperature.

For example, U.S. Pat. No. 3,365,413 discloses a process for the blow extrusion of clear water-dispersible polyvinyl alcohol tubing. A plasticized polyvinyl alcohol composition having a residual acetate content from 25 to 40 wt % was melted at temperatures in the range of 195 to 218° C. to form a plastic mass having a viscosity within the range of 100 to 20,000 poises.

U.S. Pat. No. 3,997,489 discloses polyvinyl alcohol compositions of improved melt flow characteristics obtained by the use of extrusion aids comprising a combination of a low molecular weight hydrocarbon oil or wax and a higher molecular weight ethylene homo- or copolymer.

U.S. Pat. No. 4,119,604 discloses films prepared by melt extrusion or aqueous casting from compositions consisting essentially of (i) a resin mixture containing a low molecular weight polyvinyl alcohol and a medium molecular weight polyvinyl alcohol, and, optionally, a copolymer of vinyl alcohol and an ethylenically unsaturated ester, and (ii) as a plasticizer a polyethylene glycol.

U.S. Pat. No. 4,206,101 discloses films which are rapidly and completely soluble in cold water, and which are suitable for use as packaging film in automatic packaging equipment prepared by conventional melt extrusion processes from a composition consisting essentially of 5-20 parts by weight of a polyethylene glycol (having an average molecular weight in the range between 325 and 550) in 100 parts by weight of a partially hydrolyzed low molecular weight polyvinyl alcohol.

U.S. Pat. No. 4,469,837 discloses a thermoplastic composition adapted for thermoplastic molding and extrusion comprising a substantially dry mixture of polyvinyl alcohol with at least one or more solid polyhydroxylated monomeric alcohols.

U.S. Pat. No. 4,529,666 discloses plasticized polyvinyl alcohol containing one or more 1,4-monoanhydrohexitols and/or one or more 1,4-3,6-dianhydrohexitols and its use for the production of composite films by coextrusion, coating, doubling and lamination.

U.S. Pat. No. 4,611,019 discloses the addition of small amounts of selected polyamides or polyesters to plasticized melt-extrudable polyvinyl alcohol homopolymer.

U.S. Pat. No. 4,672,087 discloses articles made from polyvinyl alcohol by forming polyvinyl alcohol containing a non-hydroxyl plasticizer in a substantially water-free condition and cooling at a rate sufficiently slow to provide enhanced impermeability.

JPS6195054A discloses a method for producing polyvinyl alcohol-type polymers with excellent thermostability by incorporating acetic acid, sodium acetate and a partial alkali metal salt of an inorganic polybasic acid with a limited pKa value in a polyvinyl alcohol-type polymer.

None of the above disclosures suggest the suitability of melt-extrudable thermoplastic polyvinyl alcohol compositions for preparing pellets for use as diverting agents in treatment subsurface formations.

SUMMARY OF THE INVENTION

The present invention relates to a diverting agent comprising pellets of melt-extrudable thermoplastic polyvinyl alcohol compositions, methods for preparing pellets from such melt-extrudable thermoplastic polyvinyl alcohol compositions, and methods for treatment of subsurface formations with such diverting agents.

More specifically, the present invention provides a particulate diverting agent composition comprising pellets of a melt-extrudable, thermoplastic polyvinyl alcohol composition comprising: (1) a polyvinyl alcohol component comprising a polyvinyl alcohol resin which is a hydrolyzed polymer of vinyl acetate and optionally minor amounts of one or more comonomers, and (2) a plasticizer, wherein:

(a) the thermoplastic polyvinyl alcohol composition has a melt flow index in the range of from about 0.5 to about 60 g/10 min (190° C., 21.6 kg);

(b) the polyvinyl alcohol has degree of hydrolysis is in the range of from about 60 mol % to 100 mol %, and a degree of polymerization of form about 200 to about 3000; and (c) the diverting agent composition has a D(90) pellet size of a length of from about 2 mm to about 6 mm, and a diameter of from about 2 mm to about 5 mm.

In one embodiment, the polyvinyl alcohol composition further comprises at least one additional additive selected from the group consisting of a starch and a filler.

In one embodiment, the polyvinyl alcohol is partially- or fully-hydrolyzed polyvinyl acetate homopolymer.

In yet another embodiment, the polyvinyl alcohol resin component is a transition product as explained below.

The particulate diverting agents of the present invention are prepared by pelletizing the polyvinyl alcohol resin component and additive(s). As the resin adheres to itself in the pelletization process, no additional binder is needed to agglomerate the mixture. In other words, the specified polyvinyl alcohol component functions as the binder for the pellet. Additives such as fillers, starches, and plasticizers are added to the resin as necessary. The resin pelletization can be carried out using conventional pelletization methods and equipment such as described, for example, in US2005001348A1.

The present invention thus also relates to a method of making the particulate diverting agent, comprising the step of extruding the melt-extrudable, thermoplastic polyvinyl alcohol composition in a twin-screw extruder to a strand, and cutting the strand to the pellet size.

The particulate diverting agents of the present invention are particularly suitable for use in subterranean formations where formation temperatures are typically about 200° F. or lower. In some cases, however, the particulate diverting agents can have suitable stability for sufficient time periods at temperatures of up to about 250° F.

The present invention thus also relates to a method of treating a subsurface formation to divert flow of a fluid from one zone of the subsurface formation to another, by pumping into the subsurface formation an aqueous carrier liquid having dispersed therein the particulate diverting agent.

An additional advantage of the polyvinyl alcohol-based particulate diverting agents of the present invention is that they are environmentally friendly as they are temporary, and the specified polyvinyl alcohols are considered non-toxic and biodegradable.

These and other embodiments, features and advantages of the present invention will be more readily understood by those of ordinary skill in the art from a reading of the following detailed description.

DETAILED DESCRIPTION

The present invention relates to particulate polyvinyl alcohol-based diverting agents for use in subterranean treatments. In particular, the present invention relates to particulate diverting agents manufactured by pelletizing specified polyvinyl alcohol polymers with certain additives and optionally other components. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "substantial portion" or "substantially", as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising vinyl acetate and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates or pellets) as used herein means that the particles do not materially further agglomerate (for example, do not materially further aggregate, cake or clump), as is well understood by those of ordinary skill in the relevant art. Free-flowing particles need not be "dry" but, desirably, the moisture content of the particles is substantially internally contained so that there is minimal (or no) surface moisture.

The term "D(X) pellet size" means at least about X % of the sample's pellets have the specified dimension. For example, "D(90) pellet size" means at least about 90% of the sample's pellets have the specified dimension.

The term "substantially soluble in water" and "soluble in water" means substantially completely (or completely) soluble in deionized water under the stated conditions.

The term "substantially soluble in brine" and "soluble in brine" means substantially completely (or completely) soluble in "brine" under the stated conditions. For the purposes of the present invention, "brine" generally means a water solution with NaCl concentration of up to 2.9 wt %.

The term "acid-soluble weighting agent" means a material that is soluble in an acidic medium, or reacts in acidic medium to result in a product that is soluble in water. For example, calcium carbonate reacts in an acidic medium to generate calcium salt that is soluble in water.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

The present invention relates to thermoplastic polyvinyl alcohol-based diverting agents for use in subterranean treatments. In particular, the present invention relates to a pelletized diverting agents manufactured by extruding the specified polyvinyl alcohol with certain additives and optionally other polymers.

The diverting effects of the polyvinyl alcohol used in this invention are temporary as they are soluble after a period of time in the subterranean formation.

An advantage of the polyvinyl alcohol based diverting agent of this invention is that they are environmentally-friendly as they are non-toxic and biodegradable. Further details are provided below.

Polyvinyl Alcohol Polymers

Polyvinyl alcohol homopolymers and copolymers are in a general sense well-known polymers and are generally commercially available in many forms for a variety of end-uses.

Polyvinyl alcohol cannot readily be produced directly from vinyl alcohol. Instead, polyvinyl alcohol is produced on a commercial scale by polymerizing vinyl acetate (with optional comonomers) to generate polyvinyl acetate, after which the acetate groups are hydrolyzed to hydroxyl groups in varying degrees. Several different hydrolysis methods are well-known and can be used for this purpose.

The polyvinyl acetate polymer starting material is typically produced by the free radical polymerization of the vinyl acetate monomer optionally with one or more comonomers in the presence of a polymerization catalyst. The solvent commonly used in the commercial polymerization of vinyl acetate is methanol. The polymerization is typically conducted in the temperature range of from about 10° C. to about 80° C. The lower end of the polymerization range is known to give products with improved properties. The percent conversion of vinyl acetate to polyvinyl acetate can vary over a wide range. Though conversions ranging from about 20% to 100% have been found satisfactory, commercially at least about 30% conversion is preferable. The degree of polymerization of polyvinyl acetate typically varies anywhere from about 200 to about 10000.

Minor amounts of one or more comonomers can be copolymerized with vinyl acetate to modify the properties of the ultimate polyvinyl alcohol. Suitable comonomers include, for example, ethylene and acid-functional comonomers such as disclosed in U.S. application Ser. No. 16/364,972 (filed 26 Mar. 2019).

The polyvinyl acetate is converted to polyvinyl alcohol via hydrolysis or alcoholysis processes generally known to those of ordinary skill in the relevant art. In such processes, the polyvinyl acetate is contacted with an alkali catalyst such as sodium hydroxide or sodium methylate. The major products of this reaction are polyvinyl alcohol and methyl acetate.

The hydrolysis conditions can be used to change the properties of the ultimate polyvinyl alcohol as generally known to those of ordinary skill in the relevant art, and as disclosed in US2017/0260309A1 and US2019/0055326A1.

Regardless of the hydrolysis process, the resulting polyvinyl alcohols, of course, will have substantially the same monomer makeup and degree of polymerization as the starting polyvinyl acetates.

In one embodiment, the polyvinyl alcohol is one or more partially- or fully-hydrolyzed polyvinyl alcohol homopolymers. Such polyvinyl alcohol homopolymers are generally commercially available, for example, under the brands KURARAY POVAL™ and ELVANOL™ from Kuraray Co., Ltd. (Tokyo, Japan) and its affiliates.

In another embodiment, the polyvinyl alcohol is one or more partially- or fully-hydrolyzed polyvinyl alcohol copolymers, for example, copolymers with minor amounts of ethylene and/or acid-functional comonomers. Examples of commercially available acid-functional polyvinyl alcohol copolymers include KURARAY POVAL™ K-series grades such as 32-97KL, 25-88KL, 6-77KL and 30-94KL, and ELVANOL™ 80-18. Ethylene-polyvinyl alcohol copolymers are generally commercially available, for example, under the brand EXCEVAL™ from Kuraray Co., Ltd. (Tokyo, Japan) and its affiliates.

In one embodiment, the polyvinyl alcohol is a mixture of two or more of the above.

In one embodiment, the polyvinyl alcohol is a transition product produced in a continuous hydrolysis process. Such transition product is in essence an intimate reactor blend of multiple polyvinyl alcohol grades as would be recognized by one of ordinary skill in the relevant art.

For example, in many commercial continuous polyvinyl alcohol hydrolysis processes, instead of completely stopping the process and cleaning the equipment, the polyvinyl acetate feed is transitioned and/or the reaction conditions are transitioned from grade to grade. At some point, the process starts producing one grade of specified properties then transitions over time to a second grade of specified properties. This interim production is referred to as a transition grade.

In one embodiment, this transition grade is produced by transitioning production of the acid-functional polyvinyl alcohol copolymer to production of a polyvinyl alcohol homopolymer (or vice versa). In this case, the polyvinyl alcohol homopolymer is less soluble than the acid-functional polyvinyl alcohol copolymer so that the dissolution rate of the particulate lost circulation can be modified.

In another embodiment, the transition grade is produced by altering the hydrolysis conditions, for example, thermal treatment step and/or level of excess catalyst neutralization, which can result in different solubility polyvinyl alcohols from the same starting polyvinyl acetate.

In another embodiment, the transition grade is produced by transitioning both the starting polyvinyl acetate and the hydrolysis conditions (for example, thermal treatment step and/or level of excess catalyst neutralization).

While the exact composition of the transition grade varies as a function of time, when different polyvinyl acetate starting materials are used the average composition should fall within the blend proportions as described above.

The polyvinyl alcohol resin used in this invention preferably has the following properties.

The polyvinyl alcohol resin should have a degree of hydrolysis of from about 60 mol %, or from about 65 mol %, or from 70 mol %, or from about 75 mol %, or from about 85 mol %, or from about 90 mol %, or from about 93 mol %, or from about 95 mol %, or from about 98 mol %, or from about 99 mol %, to 100 mol % (maximum). In one specific embodiment, the degree of hydrolysis is in the range of from about 60 mol % to 100 mol %. In another specific embodiment, the degree of hydrolysis is in the range of form about 65 mol % to about 90 mol %. The degree of hydrolysis can be measured in accordance with JIS K6726 (1994).

The viscosity-average degree of polymerization of polyvinyl acetate (and resulting polyvinyl alcohol) varies anywhere from about 200, or from about 300, or from about 500, or from about 700, to about 3000, or to about 2000. The viscosity-average degree of polymerization of a polyvinyl alcohol copolymer is a value measured in accordance with JIS K6726 (1994), as described above.

Preferred viscosity, based on a solution of 4 wt % in water (20° C., DIN 53015), is in the range of from about 2 mPa, or from about 3 mPa, to about 70 mPa, or to about 40 mPa, or to about 30 mPa, or to about 15 mPa.

Preferred volatile components and/or volatile impurities should be present in the polyvinyl alcohol in amount of less than about 2 wt %, or less than about 1.5 wt %, or less than about 1 wt %, based on the total weight of the polyvinyl alcohol resin.

Preferred water content of the polyvinyl alcohol resin should be less than 2 about wt % (determined according DIN 51777, method of Karl-Fischer).

Preferred methanol content of the polyvinyl alcohol resin should be less than about 2 wt %, or less than about 1.5 wt %, or less than about 1 wt %, based on the total weight of the polyvinyl alcohol resin.

Plasticizer

Polyvinyl alcohol polymers in the unplasticized state have a high degree of crystallinity and show little or no thermoplasticity before the occurrence of decomposition which starts at about 170° C. and becomes pronounced at 200° C. The crystallinity of polyvinyl alcohol with a degree of hydrolysis in the 98-99 mole % range is 30-40% depending on the manufacturing conditions. The higher the heat history experienced by the polyvinyl alcohol resin, the higher the crystallinity. The crystallinity of 87-89 mole % hydrolyzed polyvinyl alcohol is in the 12-18% range and is fairly independent of the manufacturing conditions used.

In order to make a thermoplastic polyvinyl alcohol, therefore, plasticizers are included in manufacturing of the diverting agents of the present invention to improve the flow characteristics of the polyvinyl alcohol. These plasticizers are low-molecular-weight organic substances which have relatively high polarity. This polar and hydrophilic structure is needed to achieve maximum compatibility with the polyvinyl alcohol structure, which is likewise highly polar and hydrophilic. Preferred plasticizers are polyhydric alcohols, e.g. glycerine, diglycerine, sorbitol, ethylene glycol, diethylene glycol, polyethylene glycol, pentaerythritol, dipentaerythritol, propylene glycol, trimethylolpropane, di-trimethylolpropane, triethanolamine may be used for the purpose of the invention and mixtures thereof.

Plasticizers which are solid or crystalline at ambient temperatures, such as trimethylolpropane, may be dissolved in water or another liquid plasticizer medium for use as a sprayable plasticizer.

Typically the level of the plasticizer can vary from about 2 wt % to about 30 wt %, or to about 20 wt %, or to about 10 wt %, based on the total weight of the polyvinyl alcohol composition.

Different plasticizers can also be blended to help tailor and control the solubility levels of the polyvinyl alcohol compositions and ultimate diverting agent.

Other Optional Additives

The diverting agents of the present invention may optionally contain one or more additives such as slip additives, antioxidants, pigments, dyes, fillers, starches and polymeric compounds as well as mixtures thereof.

In many instances it may be desirable to add a weighting agent filler to the resin in order to increase the specific gravity of the diverting agent.

For example, the weighting agent can comprise a metal ion selected from the group consisting of calcium, magnesium, silica, barium, copper, zinc, manganese and mixtures thereof, and a counterion is selected from the group consisting of fluoride, chloride, bromide, carbonate, hydroxide, formate, acetate, nitrate, sulfate, phosphate and mixtures thereof.

In one embodiment, the filler is an acid-soluble weighting agent, which generally include substances such as natural minerals and inorganic and organic salts. Specific examples include minerals such as $CaCO_3$, $CaCl_2$ and ZnO.

In other embodiments of this invention, fillers may be blended with the resin to enhance its mechanical properties and regulate the solubility of the diverting agents.

In yet another embodiment, a starch can be added. Such blend can typically comprise from about 10 to about 90 parts by weight of the polyvinyl alcohol resin component and from about 90 to about 10 parts by weight of a starch, based on 100 parts by weight of the combination of polyvinyl alcohol resin component and starch. Preferably, however, there should be at least about 30 parts by weight polyvinyl alcohol resin component in any starch blend.

Suitable starches for use in the present invention include natural starches, synthetic starches, physically modified starches, chemically modified starches and mixtures thereof.

One or more other additives can be incorporated into the diverting agents as necessary. The additives include but are not limited to chelators, pH-adjusting agents, oxidizing agents, scale inhibitors, corrosion inhibitors, clay control additives, iron control additives, reducers, oxygen scavengers and the like. Use of such other additives in subsurface well operations is generally known to those of ordinary skill in the relevant art, as exemplified by many of the previously incorporated references.

The additives are blended with the polyvinyl alcohol resin prior to extrusion or during extrusion, as described below.

The total amount of additives (plasticizer plus optional additives) can vary widely depending on the desired property modification, for example, up to about 50 wt %, or up to about 40 wt %, or up to about 20 wt %, or up to about 5 wt %, based on the total weight of the polyvinyl alcohol composition.

Preparation of the Pellets

The pellets for the diverting agents of the present invention can be prepared by conventional extrusion and pelletizing techniques.

According to a preferred embodiment, the pellets are made by compounding the polyvinyl alcohol composition in an extruder by a process commonly known to those skilled in the art. The components can be premixed before feeding into the extruder, can be separately fed into the extruder, or some combination thereof.

A twin-screw extruder is preferred because it can handle a wider variety of components conditions (such as viscosity) and ultimately provides a good mixing of the components to produce a pellet of consistent composition.

The strand resulting from the extrusion is then cut into pieces to form the pellets.

The pellets can be made into any desired shaped depending on the extrusion die (cylindrical, oval, rectangular, star, etc.), but typically they are substantially cylindrical in shape.

The preferred length of the pellets is from about 2 mm, or from about 3 mm, to about 5 mm, or to about 4 mm. The diameter of the pellets is from about 1.2 mm, or from about 2 mm, to about 5 mm, or to about 4 mm. If the pellet is not cylindrical, then the diameter should be taken as the widest part of the pellet.

These dimensions have been found as particularly suitable for balancing plugging effectiveness versus water solubility and speed of plug disintegration, and the diverting agent should preferably comprises a D(90) pellet size within the above dimensions.

The pellets preferably have a bulk density of from about 0.5 g/ml to about 0.8 g/ml.

In one embodiment, a diverting agent which yields a combination of good solubility properties and density comprises: (a) from about 60 wt % to about 98 wt % polyvinyl alcohol resin component; (b) from 0 wt % to about 40 wt % filler; and (c) from about 2 wt % to about 30 wt % plasticizer, based on the total weight of (a), (b) and (c).

Use of Diverting Agents

The particulate diverting agents of the present invention can be used in fluid injection operations for subsurface wells by processes as generally known to those of ordinary skill in the art, and as exemplified in many of the previously incorporated references.

As indicated previously, the particulate diverting agents of the present invention are particularly suitable for use in subterranean formations where formation temperatures are typically about 195° F. or lower, although in some cases the particulate diverting agents can have suitable stability for sufficient time periods at temperatures of up to about 250° F.

The following example will facilitate a more complete understanding of the present invention but it is understood that the invention is not limited to the specific embodiments incorporated therein.

Example

The diverting agent (DM-1) was prepared by extruding a commercially available polyvinyl alcohol under the trade designation of KURARAY POVAL™ 8-88 (Kuraray America, Inc., Houston, Tex. USA). KURARAY POVAL™ 8-88 has the following published specifications:

Degree of hydrolysis: 86.7-88.7 mol %
Degree of polymerization approx. 800
Viscosity (4 wt %): 7.0-9.0 mPa·s
pH value (4% solution): 4.5-7.0
Non-Volatile Content: 97.5%±2.5%
Ash content: 0.5% (max)

The compounding of the polyvinyl alcohol was performed in a twin-screw extruder (ZSE 27 GL 1200 Leistritz), with screw diameter 27 mm, an L/D of 40, and 9 heating zones. The extrusion of polyvinyl alcohol was performed via two-stage processes. In the first stage, 1000 g of KURARAY POVAL™ 8-88 and 130 grams of glycerin were mixed in a forced-circulation mixer to give a flowable blend, and in the second stage the extruder was used to melt and further process the material to give moldings. No fillers were used. The temperature settings for the individual heating zones were 30° C., 50° C., 90° C., 130° C., 180° C., 180° C., 180° C., 180° C. and 180° C. A perforated die was used to produce strands. The resultant strands were homogeneous and free from blisters. The cooling methods used were a mesh belt with air cooling and also water-bath cooling, with downstream pelletization. The extruded strands were cut into pellets of 3-4 mm in length and 2-4 mm in diameter.

The produced pellets were analyzed by means of DSC measurement. The melt-flow index (MFI) (190° C., 21.6 kg) was 39±8 g per 10 min, glass transition temperature $T_g=34°$ C., and melt temperature $T_m=178°$ C. The solubility of the diverting agents DM-1 was determined in deionized water as well as in brine at 122° F. and at 149° F. Results are shown in Table 1 (DI Water) and Table 2 (brine).

Solubility Test

Diverting agent solution (6 wt. %) was prepared by adding 30 grams of the diverting agent and 470 grams of deionized water into a dissolution vessel. The dissolution vessel was then placed in a water bath. The water bath heat controller was set at the desired temperature (122° F. or 149° F.) The agitator speed inside the dissolution vessel was set at 20 RPM. The timer was started as soon as the temperature inside of the dissolution vessel reached the desired temperature (122° F. or 179° F.). 10 mL of sample in the dissolution vessel was then collected in a centrifuge tube at time (t): 15, 30, 60, 120, 180, 240, 300, 360 and 420 minutes. The 10 mL sample was placed in centrifuge for 10 minutes at 1,500 RPM. The supernatant liquid was filtered through a 200 mesh sieve screen and placed into a pre-weighed aluminum pan. The sample together with the aluminum pan was then placed in an oven set to 105° C. and left overnight to dry. The pan and contents were weighed and the % solubles were then calculated using the following equation:

Water Solubles (%)=(Weight of Residue plus pan–Weight of pan)*100/Weight of sample The solubility in brine was determined using the above procedure except brine (5.84 grams of sodium chloride and 994.16 grams of deionized water) was used instead of deionized water to dissolve the diverting agent.

TABLE 1

| Div. Agent | Time (min) | Dissolution (wt %) @ 122° F. | Div. Agent | Time (min) | Dissolution (wt %) @ 149° F. |
|---|---|---|---|---|---|
| DM-1 | 0 | 0 | DM-1 | 0 | 0 |
| | 15 | 49.7 | | 15 | 54.3 |
| | 30 | 51.5 | | 30 | 56.9 |
| | 60 | 56.8 | | 60 | 60.2 |
| | 120 | 61.5 | | 120 | 65.3 |
| | 180 | 65.7 | | 180 | 65.3 |
| | 240 | 67.3 | | 240 | 65.9 |
| | 300 | 70.7 | | 300 | 66.0 |
| | 360 | 70.9 | | 360 | 66.5 |
| | 420 | 70.9 | | 420 | 69.9 |

TABLE 2

| Div. Agent | Time (min) | Dissolution (wt %) @ 122° F. | Div. Agent | Time (min) | Dissolution (wt %) @ 149° F. |
|---|---|---|---|---|---|
| DM-1 | 0 | 0 | DM-1 | 0 | 0 |
| | 15 | 40.0 | | 15 | 41.1 |
| | 30 | 42.4 | | 30 | 46.0 |
| | 60 | 46.6 | | 60 | 53.6 |
| | 120 | 53.5 | | 120 | 67.5 |
| | 180 | 58.1 | | 180 | 70.2 |
| | 240 | 60.8 | | 240 | 72.0 |
| | 300 | 61.5 | | 300 | 72.4 |
| | 360 | 63.2 | | 360 | 73.4 |
| | 420 | 64.2 | | 420 | 73.5 |

What is claimed:

1. A particulate diverting agent composition comprising pellets of a melt-extrudable, thermoplastic polyvinyl alcohol composition comprising: (1) a polyvinyl alcohol component comprising a polyvinyl alcohol resin which is a hydrolyzed polymer of vinyl acetate and optionally minor amounts of one or more comonomers, and (2) a plasticizer, wherein:
   (a) the thermoplastic polyvinyl alcohol composition has a melt flow index in the range of from about 0.5 to about 60 g/10 min (190° C., 21.6 kg);
   (b) the polyvinyl alcohol resin has degree of hydrolysis is in the range of from about 60 mol % to 100 mol %, and a viscosity-average degree of polymerization of from about 200 to about 3000;
   (c) the diverting agent composition has a D(90) pellet size of a length of from about 2 mm to about 6 mm, and a diameter of from about 2 mm to about 5 mm; and
   (d) the polyvinyl alcohol resin has a methanol content of less than 2 wt % based on the total weight of the polyvinyl alcohol resin.

2. The particular diverting agent of claim 1, wherein the polyvinyl alcohol composition further comprises at least one additional additive selected from the group consisting of a starch and a filler.

3. The particular diverting agent of claim 2, wherein the polyvinyl alcohol composition further comprises a filler.

4. The particulate diverting agent of claim 3, wherein the filler is an acid-soluble weighting agent.

5. The particulate diverting agent of claim 1, wherein the polyvinyl alcohol resin is a fully- or partially-hydrolyzed polyvinyl alcohol homopolymer.

6. The particulate diverting agent of claim 1, wherein the polyvinyl alcohol resin is a transition product.

7. The particulate diverting agent of claim 1, wherein the polyvinyl alcohol resin has a viscosity, based on a solution of 4 wt % in water (20° C., DIN 53015), in the range of from about 2 mPa to about 70 mPa.

8. The particulate diverting agent of claim 1, wherein the polyvinyl alcohol resin has a content of volatile components and/or volatile impurities in an amount of less than about 2 wt % based on the total weight of the polyvinyl alcohol resin.

9. The particulate diverting agent of claim 1, wherein the polyvinyl alcohol resin has a water content of less than 2 about wt % (DIN 51777, method of Karl-Fischer).

10. The particulate diverting agent of claim 1, wherein the pellets are substantially cylindrical in shape.

11. The particulate diverting agent of claim 1, wherein the pellets have a bulk density of from about 0.5 g/ml to about 0.8 g/ml.

12. A method of making the particulate diverting agent, comprising the step of extruding the melt-extrudable, thermoplastic polyvinyl alcohol composition in a twin-screw extruder to a strand, and cutting the strand to the pellet size, wherein the melt-extrudable, thermoplastic polyvinyl alcohol composition comprises: (1) a polyvinyl alcohol component comprising a polyvinyl alcohol resin which is a hydrolyzed polymer of vinyl acetate and optionally minor amounts of one or more comonomers, and (2) a plasticizer, wherein:
   (a) the thermoplastic polyvinyl alcohol composition has a melt flow index in the range of from about 0.5 to about 60 g/10 min (190° C., 21.6 kg);
   (b) the polyvinyl alcohol resin has degree of hydrolysis is in the range of from about 60 mol % to 100 mol %, and a viscosity-average degree of polymerization of from about 200 to about 3000;
   (c) the diverting agent composition has a D(90) pellet size of a length of from about 2 mm to about 6 mm, and a diameter of from about 2 mm to about 5 mm; and
   (d) the polyvinyl alcohol resin has a methanol content of less than 2 wt % based on the total weight of the polyvinyl alcohol resin.

13. A method of treating a subsurface formation to divert flow of a fluid from one zone of the subsurface formation to another, by pumping into the subsurface formation an aqueous carrier liquid having dispersed therein a particulate diverting agent, wherein the particulate diverting agent is a particulate diverting agent composition comprising pellets of a melt-extrudable, thermoplastic polyvinyl alcohol composition comprising: (1) a polyvinyl alcohol component comprising a polyvinyl alcohol resin which is a hydrolyzed polymer of vinyl acetate and optionally minor amounts of one or more comonomers, and (2) a plasticizer, wherein:
- (a) the thermoplastic polyvinyl alcohol composition has a melt flow index in the range of from about 0.5 to about 60 g/10 min (190° C., 21.6 kg);
- (b) the polyvinyl alcohol resin has degree of hydrolysis is in the range of from about 60 mol % to 100 mol %, and a viscosity-average degree of polymerization of from about 200 to about 3000;
- (c) the diverting agent composition has a D(90) pellet size of a length of from about 2 mm to about 6 mm, and a diameter of from about 2 mm to about 5 mm; and
- (d) the polyvinyl alcohol resin has a methanol content of less than 2 wt % based on the total weight of the polyvinyl alcohol resin.

14. The method of claim 13, wherein the treating is done at a temperature of 195° F. or less.

15. The method of claim 13, wherein polyvinyl alcohol composition further comprises an acid-soluble weighting agent.

16. The method of claim 13, wherein the polyvinyl alcohol resin is a fully- or partially-hydrolyzed polyvinyl alcohol homopolymer.

17. The method of claim 13, wherein the polyvinyl alcohol resin is a transition product.

18. The method of claim 13, wherein the pellets are substantially cylindrical in shape.

19. The method of claim 13, wherein the pellets have a bulk density of from about 0.5 g/ml to about 0.8 g/ml.

* * * * *